(12) United States Patent
Furlan et al.

(10) Patent No.: US 11,915,275 B2
(45) Date of Patent: Feb. 27, 2024

(54) SYSTEMS AND METHODS FOR ESTIMATING ASSET RESALE VALUE

(71) Applicant: Capital One Services, LLC, McLean, VA (US)

(72) Inventors: Elizabeth Furlan, Plano, TX (US); Steven Dang, Plano, TX (US); Chih-Hsiang Chow, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 157 days.

(21) Appl. No.: 17/112,815

(22) Filed: Dec. 4, 2020

(65) Prior Publication Data

US 2022/0180405 A1 Jun. 9, 2022

(51) Int. Cl.
| | |
|---|---|
| G06Q 30/02 | (2023.01) |
| G06F 16/23 | (2019.01) |
| G06Q 30/018 | (2023.01) |
| G06Q 30/0204 | (2023.01) |
| G06Q 50/26 | (2012.01) |
| G01W 1/00 | (2006.01) |
| G06F 16/245 | (2019.01) |
| G06N 20/00 | (2019.01) |
| G06Q 30/0601 | (2023.01) |

(Continued)

(52) U.S. Cl.
CPC ..... *G06Q 30/0278* (2013.01); *G06F 16/2379* (2019.01); *G06Q 30/018* (2013.01); *G06Q 30/0205* (2013.01); *G06Q 50/26* (2013.01); *G01W 1/00* (2013.01); *G06F 16/245* (2019.01); *G06N 20/00* (2019.01); *G06Q 30/0613* (2013.01); *G06Q 40/02* (2013.01); *G08G 1/0104* (2013.01)

(58) Field of Classification Search
CPC ............. G06Q 30/0278; G06Q 30/018; G06Q 30/0205; G06Q 30/0613; G01W 1/00; G08G 1/0104
See application file for complete search history.

(56) References Cited

U.S. PATENT DOCUMENTS

| | | |
|---|---|---|
| 6,622,129 B1 | 9/2003 | Whitworth |
| 7,363,266 B1 | 4/2008 | Williams et al. |

(Continued)

*Primary Examiner* — Renae Feacher
(74) *Attorney, Agent, or Firm* — Bookoff McAndrews, PLLC

(57) ABSTRACT

A computer-implemented method that includes receiving a request for a target vehicle including input data associated with an operator, a geographic location, and the target vehicle. The method includes determining a depreciation rate based on third-party transaction data retrieved from databases in accordance with the input data associated with the target vehicle, and a decommission rate based on third-party ownership data retrieved from databases in accordance with the input data associated with the target vehicle. The method includes determining a deterioration rate based on local environmental data retrieved from databases in accordance with the input data associated with the geographic location, and generating a regression model configured to compute an estimated value of the target vehicle during a lifetime of the target vehicle using the input data, depreciation rate, decommission rate, and deterioration rate. The method includes determining an output in response to the request for the target vehicle.

20 Claims, 3 Drawing Sheets

(51) Int. Cl.
*G06Q 40/02* (2023.01)
*G08G 1/01* (2006.01)

(56) References Cited

U.S. PATENT DOCUMENTS

| | | | | |
|---|---|---|---|---|
| 8,645,193 | B2* | 2/2014 | Swinson | G06Q 30/02 |
| | | | | 705/26.1 |
| 10,679,226 | B1* | 6/2020 | Duckworth | G06Q 10/30 |
| 2002/0161496 | A1* | 10/2002 | Yamaki | G07C 5/085 |
| | | | | 701/31.4 |
| 2003/0105728 | A1 | 6/2003 | Yano et al. | |
| 2007/0250327 | A1 | 10/2007 | Hedy | |
| 2007/0282624 | A1* | 12/2007 | Athey | G06Q 30/0206 |
| | | | | 705/306 |
| 2008/0046383 | A1* | 2/2008 | Hirtenstein | G06Q 30/0283 |
| | | | | 705/400 |
| 2010/0198629 | A1* | 8/2010 | Weisleder | G06Q 30/02 |
| | | | | 705/7.29 |
| 2013/0030870 | A1* | 1/2013 | Swinson | G06Q 10/06 |
| | | | | 705/7.35 |
| 2014/0207705 | A1* | 7/2014 | Strauss | G06Q 40/06 |
| | | | | 705/36 R |
| 2015/0348058 | A1* | 12/2015 | Liu | G06Q 30/0201 |
| | | | | 701/31.5 |
| 2016/0225035 | A1* | 8/2016 | Gill | G06Q 30/0278 |
| 2017/0365169 | A1* | 12/2017 | Tennent | G06Q 10/06 |
| 2018/0018723 | A1* | 1/2018 | Nagla | H04L 63/08 |
| 2019/0073701 | A1* | 3/2019 | Sonnad | G07C 5/08 |
| 2021/0074080 | A1* | 3/2021 | Roberts | G07C 5/006 |

* cited by examiner

SYSTEMS AND METHODS FOR
ESTIMATING ASSET RESALE VALUE

TECHNICAL FIELD

Various embodiments of the present disclosure relate generally to estimating an asset resale value, and relate particularly to methods and systems for determining a regression model for computing an estimated value of a target asset over a lifetime of the target asset.

BACKGROUND

When evaluating whether to acquire an asset, such as, for example, a vehicle, one possible criteria that customers may consider is a prospective resale value of the vehicle at a future date. Generally, customers may utilize a vehicle in a consistent and predictable manner, but also in a way that varies from the average mode in which other customers may utilize a similar vehicle. As such, average resale metrics for similar vehicles may provide a limited reference for customers given the disparity in vehicle conditions underlying the estimates relative to the actual use of a subject vehicle. Further, typical vehicle resale estimations are limited in the variables they may consider to determine a prospective resale value. Such variable may be restricted to a make, model, trim, year, mileage, features (e.g., add-ons), and general condition of a vehicle. These methods of estimating a resale value may not be fully indicative of a market valuation of the vehicle, which may hinder a customer from making an informed decision at a time of purchase or sale.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for calculating resale estimates for an asset. Each of the examples disclosed herein may include one or more of the features described in connection with any of the other disclosed examples.

In one example, a computer-implemented method may include: receiving a request for a target vehicle, wherein the request includes input data associated with at least an operator, a geographic location, and the target vehicle; determining a depreciation rate based on third-party transaction data retrieved from one or more databases in accordance with the input data associated with the target vehicle; determining a decommission rate based on third-party ownership data retrieved from one or more databases in accordance with the input data associated with the target vehicle; determining a deterioration rate based on local environmental data retrieved from one or more databases in accordance with the input data associated with the geographic location; generating a regression model configured to compute an estimated value of the target vehicle during a lifetime of the target vehicle using the input data, the depreciation rate, the decommission rate, and the deterioration rate; and determining an output in response to the request for the target vehicle.

In another example, a computer-implemented method may include: receiving a user input including operator data, geographic location data, and target vehicle data; retrieving third-party transaction data from one or more databases based on the target vehicle data to calculate a depreciation rate; retrieving third-party ownership data from one or more databases based on the target vehicle data to calculate a decommission rate; retrieving local environmental data from one or more databases based on the geographic location data to calculate a deterioration rate; generating a regression model configured to compute a value curve using the operator data, the target vehicle data, the depreciation rate, the decommission rate, and the deterioration rate.

In a further example, a system may include a processor, and a memory storing instructions that, when executed by the processor, causes the processor to perform operations including: receiving driver data, location data, and vehicle data; retrieving third-party transaction data related to the vehicle data from one or more databases; determining a depreciation rate based on the third-party transaction data; retrieving third-party ownership data related to the vehicle data from one or more databases; determining a decommission rate based on third-party ownership data; retrieving local environmental data related to the location data from one or more databases; determining a deterioration rate based on the local environmental data; generating a regression model configured to compute a value estimate of a target vehicle using one or more of the third-party transaction data, the third-party ownership data, the local environmental data, the depreciation rate, the decommission rate, or the deterioration rate.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
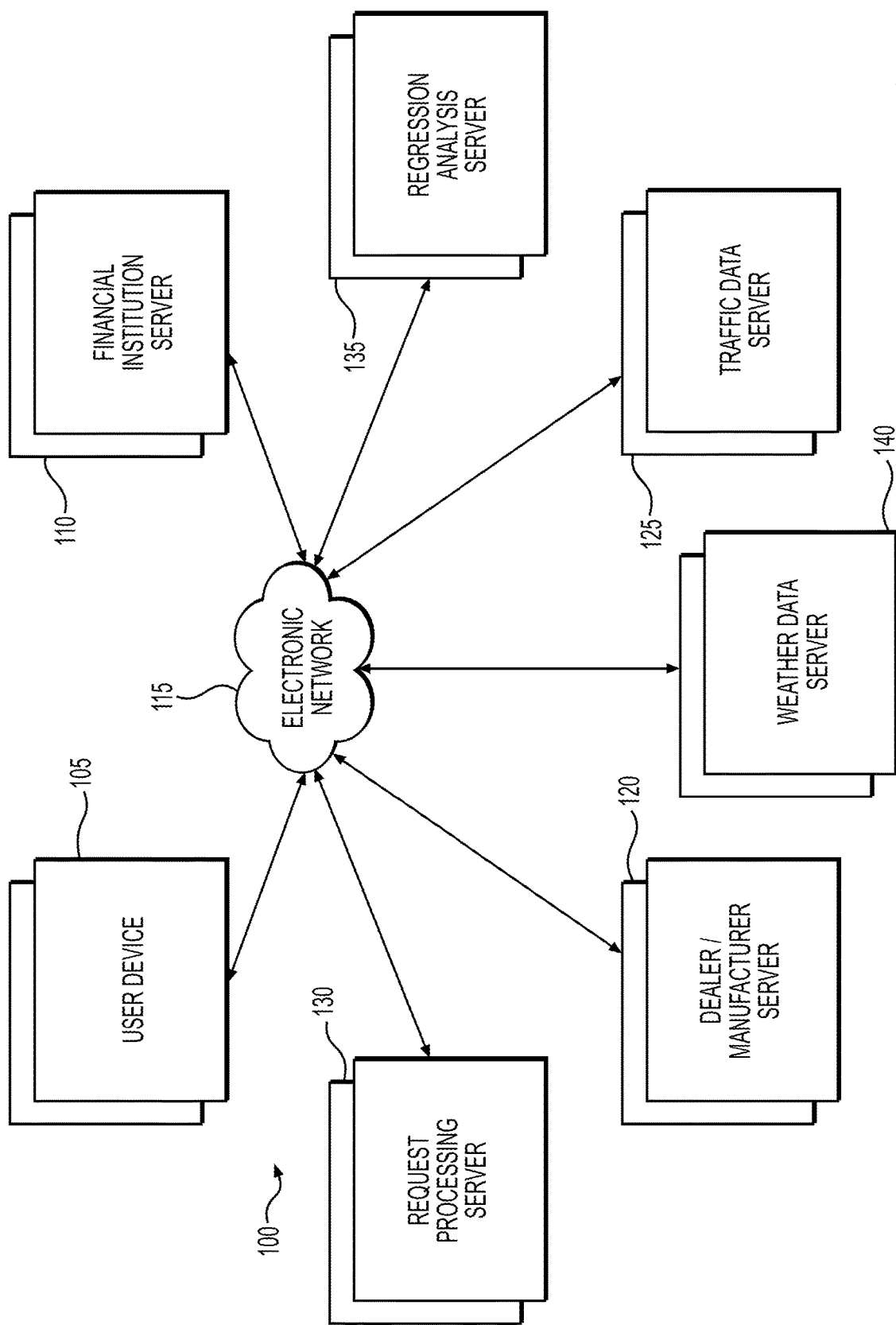
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

As used herein, the term "vehicle" may indicate, and may be used interchangeably with, any device, system, apparatus or instrument of conveyance used for transporting passengers or objects by land, water, or air. By way of illustrative example only, a vehicle may include an automobile, a motorcycle, an airplane, a ship, a boat, etc. It should be appreciated that the embodiments of the present disclosure may not be limited to vehicles, rather, the systems and methods disclosed herein may be applicable to various suitable devices, apparatuses, properties, assets, and the like without departing from a scope of this disclosure. The term "operator" may indicate, and may be used interchangeably with, an owner, a customer, a buyer, a person attempting to obtain ownership of a good (e.g., property asset) and/or service.

In general, the present disclosure provides methods and systems for using machine learning techniques to generate a dynamic regression model capable of estimating vehicle resale values, optimum resale times, reasonable buyback prices, optimum vehicle types for purchase, and more. As will be discussed in greater detail herein, existing techniques may be improved with the methods and systems of the present disclosure.

Customers seeking to purchase or sell a vehicle may desire knowledge of a prospective resale value of the vehicle at a current or future date. A condition of a vehicle may be affected by various factors apart from a type and age of the vehicle. A manner in which a vehicle is utilized by one customer may vary from a manner in which other customers utilize a similar vehicle. Accordingly, average resale data of similar vehicles may be limited in accurately assessing a resale potential of the target vehicle as a method of use (e.g., driving pattern) may influence a valuation. With standard calculations for estimating a resale value being limited to certain factors, a resulting assessment may be restricted. Accordingly, a need exists to provide a dynamic ability to estimate valuations of vehicles based on various variables pertinent to the specific characteristics and conditions of a vehicle.

FIG. 1 depicts an exemplary client-server environment that may be utilized with techniques presented herein. For example, the environment may include a system 100 with one or more user devices 105, one or more financial institution servers 110, one or more request processing servers 130, and one or more regression analysis servers 135. System 100 may further include one or more data source providers, such as, for example, one or more dealership and/or manufacturer (DM) servers 120, one or more traffic data servers 125, and one or more weather data servers 140. The one or more devices and databases of system 100 of FIG. 1 may communicate with one another across an electronic network 115 and in any arrangement. User device 105 may be associated with an operator, such as, for example, an operator seeking to estimate a valuation of a property asset (e.g., a vehicle).

The operator may access the one or more other components of system 100 via user device 105, such as, for example, via an electronic application (e.g., a text messaging application, an e-commerce application, a social media application, or the like), an internet browser extension, and/or a website page. The operator may conduct one or more operations of the present disclosure, such as, for example, implementing a dynamic regression model to estimate a vehicle resale value, an optimum resale time, a reasonable buyback price, an optimum vehicle type for purchase, and the like via user device 105. As described in greater detail herein, the operator may further access, review, and/or conduct one or more transactions via user device 105, such as, for example, purchasing and/or selling a vehicle to one or more parties (e.g., a vehicle dealership, a vehicle manufacturer, a financial institution, a third-party, etc.).

One or more of user device 105, request processing server 130, and/or regression analysis server 135 may communicate with each other over electronic network 115 in executing a machine learning model to process a valuation request for conducting a vehicle estimate analysis, generating a regression model based on a plurality of static and dynamic factors, and determining one or more valuation outputs (e.g., an estimated value of a target vehicle, an optimum date to sell a target vehicle, and more). It should be appreciated that the term "valuation" and/or "estimate" may include various forms of detail, data, or information relating to an economic assessment of a property asset (e.g., a vehicle). As used herein, a "machine learning model" may include data (e.g., product data, vendor data, or historical customer data) or instruction(s) for generating, retrieving, and/or analyzing such data.

Still referring to FIG. 1, electronic network 115 may be a wide area network ("WAN"), a local area network ("LAN"), personal area network ("PAN"), or the like. In some embodiments, electronic network 115 includes the Internet, and information and data provided between various components of system 100 may occur online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

In other embodiments, electronic network 115 may be a telecommunications network, such as, for example, a telephone network, cellular network, or the like, or combinations thereof. In some embodiments, a text messaging channel may be embedded into, linked with, or configured to operate in conjunction with an electronic application operating on user device 105 and/or on electronic network 115.

While FIG. 1 depicts the various components of system 100 as physically separate and communicating across network 115, it should be appreciated that in other embodiments one or more components of system 100 may be incorporated partially or completely into any of the other components shown in FIG. 1. Some or all of the functionality of the machine learning model may be incorporated into one or more components of system 100, such as, for example, request processing server 130, and/or regression analysis server 135. Some or all of the functionality of request processing server 130, and/or regression analysis server 135 may be accessible via user device 105 and incorporated into a text messaging application, an internet browser extension, or website page.

Figure 2:
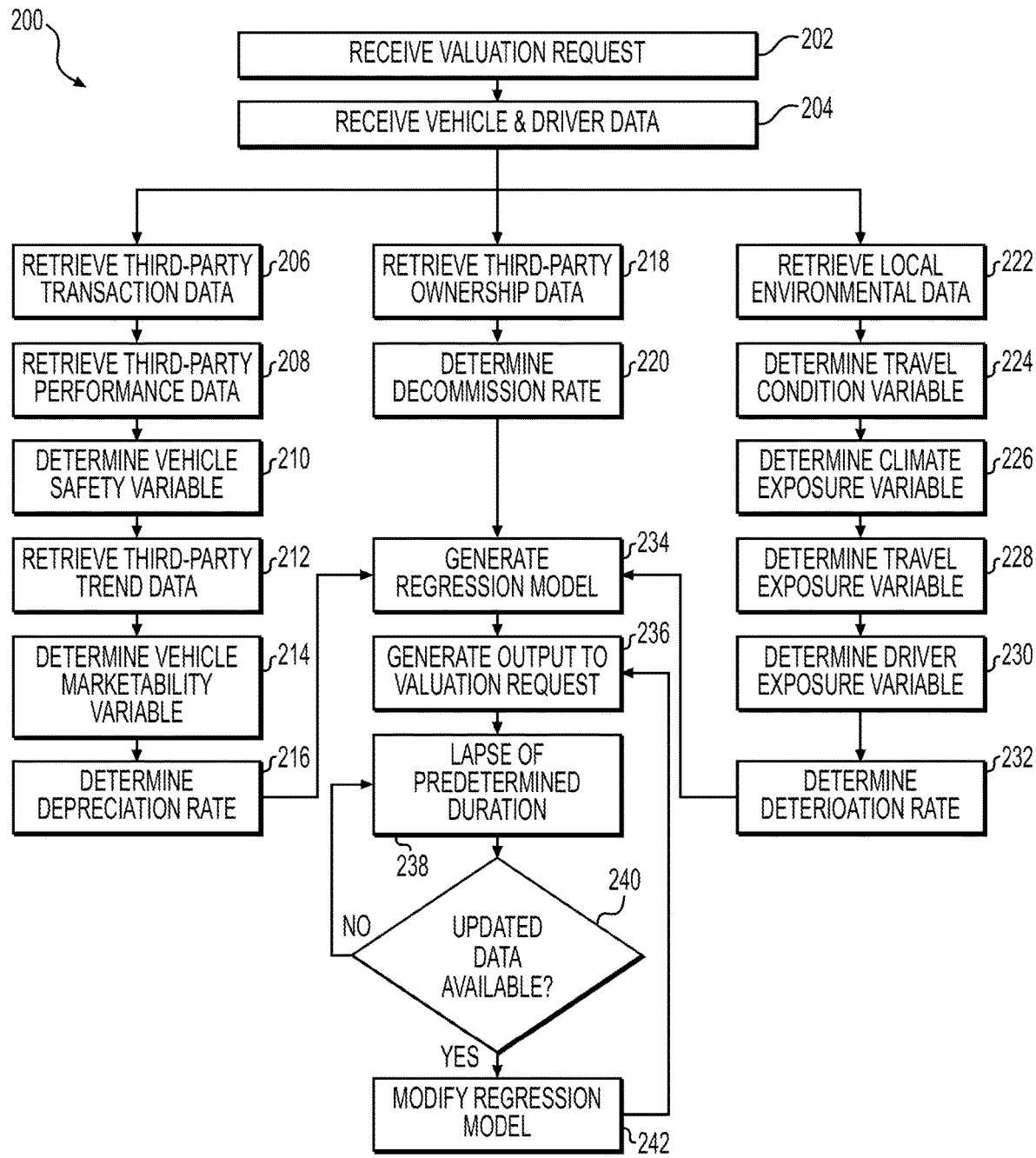
FIG. 2 depicts an exemplary process for generating a dynamic regression formula to estimate a resale value of an asset.

FIG. 2 illustrates an exemplary process 200 for determining a valuation output in accordance with embodiments of the present disclosure. It should be understood that the steps described herein, and the sequence in which they are presented, are merely illustrative such that additional and/or fewer steps may be included without departing from the scope of the present disclosure.

At step 202, system 100 may receive a valuation request at request processing server 130, such as, for example, via a user input received from user device 105. The valuation request may be directed to a particular property asset, such as, for example, a target vehicle. In this instance, the valuation request may include input data relating to the target vehicle, including but not limited to, one or more details regarding a class/category, a make, a model, a trim, a color, a year, a present condition, and/or one or more features (e.g., add-on feature) of the target vehicle. In some embodiments, the valuation request may include a current day economic valuation of the target vehicle. In other embodiments, the valuation request may include an optimum date (economic time) for the operator (e.g., an owner of the vehicle) to sell the target vehicle; and/or an optimum, economic time for the operator (e.g., a prospective buyer of the vehicle) to purchase the target vehicle. In further embodiments, the valuation request may include an optimum vehicle for the operator (e.g., a prospective buyer) to purchase from an economic standpoint.

At step 204, request processing server 130 may receive further input data from user device 105, including but not limited to, vehicle data and/or driver data. For example, the vehicle data may include information relating to a present state of one or more characteristics of the target vehicle, including a physical condition of the target vehicle, a mileage of the target vehicle, an accident history of the target vehicle, a modification of the target vehicle, and more. The vehicle data may further define one or more specifications of the target vehicle, such as features included in the vehicle. For example, the vehicle data may identify one or more (if any) safety features, convenience features, technology features, onboard systems or devices, vehicle parts, customizations, and more. The vehicle data may further include inputs directed toward a maintenance, a usage, and/or one or more common use locations of the target vehicle (e.g., a parking location(s), a travel location(s), etc.).

The driver data may include information relating to one or more driver variables of an operator(s) of the target vehicle, including a driving behavior classification (e.g., excellent, good, fair, poor, etc.), a driver record, an accident history, a driving experience, a geographic location or market of the operator(s), a list of frequent travel destinations (e.g., addresses) of the operator(s), and more. The driver data may further include an average travel distance by the operator(s) (e.g., daily, weekly, monthly, yearly, etc.), a driving style (e.g., break patterns, speeding tendencies, etc.), a common use pattern of the target vehicle (e.g., off-roading, heavy load transfer, city driving, highway driving, etc.), and more. It should be appreciated that the target vehicle may be commonly operated by more than one operator (e.g., a plurality) such that the driver data received at step 204 may include information characterizing each of the common operators of the vehicle.

In some embodiments, the driver data may be manually input by the operator of system 100. In other embodiments, the driver data may be automatically detected and recorded such that the driver data may be transmitted to system 100 at step 204. For example, at least a portion of the driver data may be generated by a sensor(s) on or associated with the target vehicle, an onboard system/device of the target vehicle, user device 105, and more. In response to receiving the valuation request at step 202 and the data at step 204, request processing server 130 may communicate the request and data to regression analysis server 135 via network 115. As described in greater detail herein, regression analysis server 135 may be configured to perform one or more operations to generate an output in response to the valuation request received at request processing server 130.

At step 206, system 100 may be configured to retrieve third-party transaction data from one or more sources, such as, for example, financial institution server 110 and/or DM server 120. The third-party transaction data may be received at regression analysis server 135 and may include historical sales information relating to prior transactions of vehicles matching the vehicle data received at steps 202, 204. The third-party transaction data of the target vehicle may be indicative of a purchase value, a sale value (e.g., new sales price, used sales price, etc.), a trade-in value, an appreciation value, a depreciation value, an appraisal value, and the like.

The third-party transaction data may be retrieved by regression analysis server 135 from one or more financial institutions (e.g., financial institution servers 110), dealerships, and/or manufacturers (e.g., DM servers 120) located within the geographic location of the operator. In other embodiments, the third-party transaction data may be retrieved from sources outside the geographic location of the operator and within a predetermined vicinity of the geographic location. In further embodiments, the third-party transaction data may be retrieved from any source, including, for example, national and/or international data sources.

At step 208, system 100 may be configured to retrieve third-party performance data from one or more sources, such as, for example, DM server 120. The third-party performance data may be received at regression analysis server 135 and may include historical performance information relating to prior operation metrics and/or reliability records of vehicles matching the vehicle data received at step 202. The third-party performance data of the target vehicle may be indicative of a working operation rating, an expected maintenance schedule, a reliability assessment, an anticipated lifetime, and the like. The third-party performance data may be retrieved by regression analysis server 135 from one or more dealerships and/or manufacturers (e.g., DM servers 120) located within the geographic location of the operator, outside the geographic location and within a predetermined vicinity of the geographic location, and/or any source including, for example, national and/or international data sources.

At step 210, system 100 may be configured to determine a vehicle safety variable of the target vehicle based on the third-party performance data (step 208) retrieved from the one or more sources. The vehicle safety variable may be determined by regression analysis server 135 and may include an assessment of the third-party performance data. In some embodiments, the third-party performance data may be analyzed relative to one or more regulations, such as, for example, local, regional, and/or national safety standards. In other embodiments, the third-party performance data may be analyzed relative to one or more other vehicles of a similar class (e.g., passenger vehicle mini, passenger vehicle light, passenger vehicle compact, passenger vehicle medium, passenger vehicle heavy, sport utility vehicle, van, pickup truck, etc.) to determine the vehicle safety variable.

The vehicle safety variable may be determined based on one or more factors, including, for example, a frontal impact rating, a side impact rating, a rear impact rating, a rollover resistance rating, collision prevention mechanisms, and more. Regression analysis server 135 may assign a score, a weighted factor, and/or a multiplier to the vehicle safety variable based on determining an association between the third-party performance data and historic resale values of similar vehicles, as retrieved from one or more of financial institution server(s) 110 and/or DM server(s) 120. As described in greater detail herein, the vehicle safety variable may be incorporated into a vehicle depreciation rate for generating a predictive regression model.

At step 212, system 100 may be configured to retrieve third-party trend data from one or more sources, such as, for example, financial institution server 110 and/or DM server 120. The third-party trend data may be received at regression analysis server 135 and may include historical sales information relating to prior transactions of vehicles matching the vehicle data received at steps 202, 204. The third-party trend data may be indicative of a recent market trend relating to the target vehicle, e.g., an increase of a quantity of similar vehicles purchased relative to a quantity of similar vehicles sold over a defined duration. The third-party trend data may be indicative of an increased popularity and/or demand measured by various other suitable mechanisms.

The third-party trend data may be retrieved by regression analysis server 135 from one or more financial institutions (e.g., financial institution servers 110) providing financing for purchases of similar vehicles, dealerships conducting sales of similar vehicles, and/or manufacturers producing similar vehicles (e.g., DM servers 120) within the geographic location of the operator. In other embodiments, the third-party trend data may be retrieved from sources outside the geographic location of the operator and within a predetermined vicinity of the geographic location. In further embodiments, the third-party trend data may be retrieved from any source, including, for example, national and/or international data sources. In some embodiments, the third-party trend data may be determined based on a historical relationship of the manufacturer's suggested retail price (MSRP) of the target vehicle.

In another example, the third-party trend data may be determined based on one or more subcomponents of the target vehicle as defined by the vehicle data (step 204), such as, for example, a feature, an accessory, a system, a device, and/or a technology included on the target vehicle. Accordingly, the third-party trend data may include a market demand (e.g., decrease, increase, etc.) of one or more components of the target vehicle. By way of further example, the third-party trend data may be determined based on data indicative of sale inquiries from prospective customers (e.g., via in-person interaction, an e-commerce application, a social media application, a website page, etc.) for similar vehicles (e.g., to dealerships, manufacturers, and/or financial institutions) without the occurrence of a sale, a production, or a financing for a similar vehicle. It should be appreciated that the sale inquiries may be stored in financial institution server 110 and/or DM server 120 in the form of third-party trend data from one or more sources despite the absence of a sale, manufacture, or financing for a similar vehicle.

At step 214, system 100 may be configured to determine a vehicle marketability variable of the target vehicle based on the third-party trend data (step 212) retrieved from the one or more sources. The vehicle marketability variable may be determined by regression analysis server 135 and may include an assessment of the third-party trend data. In some embodiments, the third-party trend data may be analyzed relative to one or more vehicles of a similar make, model, trim, age, mileage, specification, and more. In other embodiments, the third-party trend data may be analyzed relative to one or more other vehicles of a similar class (e.g., passenger vehicle mini, passenger vehicle light, passenger vehicle compact, passenger vehicle medium, passenger vehicle heavy, sport utility vehicle, van, pickup truck, etc.) to determine the vehicle marketability variable.

For example, a current market trend of the target vehicle may be analyzed relative to a current market trend of a similar and/or equivalent model of one or more other vehicle manufacturers. The vehicle marketability variable may be determined based on one or more factors, including, for example, a frequency of sales, internet searches, financing, routine maintenance orders, price fluctuations, and more. Regression analysis server 135 may assign a score, a weighted factor, and/or a multiplier to the vehicle marketability variable based on determining an association between the third-party trend data and historic resale values of similar vehicles, as retrieved from one or more of financial institution server(s) 110 and/or DM server(s) 120. As described in greater detail herein, the vehicle marketability variable may be incorporated into a vehicle depreciation rate for generating a predictive regression model.

At step 216, system 100 may be configured to determine a depreciation rate for the target vehicle that is customized based on one or more transactional metrics. For example, regression analysis server 135 may compute the depreciation rate based on the vehicle characteristics or features defined by the vehicle data (steps 202, 204), the safety rating of the target vehicle from the vehicle safety variable (step 210), and/or the marketability rating of the target vehicle from the vehicle marketability variable (step 214). The depreciation rate may be determined relative to the expected valuation of the target vehicle over its lifetime, as determined from the third-party transaction data (step 206). Stated differently, regression analysis server 135 may determine the depreciation rate by extrapolating the transactional metrics over the lifetime of the target vehicle.

As merely an illustrative example, regression analysis server 135 may increase the depreciation rate pursuant to the target vehicle including one or more relatively outdated features and/or relatively archaic characteristics (e.g., devices, systems, technology, etc.), and decrease the depreciation rate when the target vehicle includes relatively current features and/or relatively innovative characteristics. By way of further example, regression analysis server 135 may increase the depreciation rate when a safety rating of the target vehicle is relatively lower than other vehicles in the marketplace, and decrease the depreciation rate when the safety rating of the target vehicle is relatively higher than other vehicles. Further, regression analysis server 135 may increase the depreciation rate when a marketability of the target vehicle is relatively lower than other vehicles in the marketplace, and decrease the depreciation rate when the marketability of the target vehicle is relatively higher than other vehicles. Regression analysis server 135 may further adjust the depreciation rate based on the geographic location or market.

It should be understood that regression analysis server 135 may determine the depreciation rate based on a plurality of dynamic factors (e.g., the vehicle safety variable, the vehicle marketability variable, etc.) and a plurality of static factors (e.g., the vehicle characteristic(s), the vehicle valuation, etc.). Accordingly, the depreciation rate computed by regression analysis server 135 may vary depending at least partially on the data available (e.g., the third-party transaction data, the third-party performance data, the third-party trend data, etc.) when determining the depreciation rate. As described in greater detail herein, the depreciation rate may be incorporated into a predictive regression model for generating an output in response to the valuation request received at step 202.

At step 218, system 100 may be configured to retrieve third-party ownership data from one or more sources, such as, for example, financial institution server 110 and/or DM server 120. The third-party ownership data may be received at regression analysis server 135 and may include vehicle census metrics including historical ownership records of vehicles matching the vehicle data received at step 204. The third-party ownership data may include average annual measurements of a purchase, a sale, an accident, and/or a loss of vehicles similar to the target vehicle. The third-party ownership data may be indicative of an expected lifetime of the target vehicle. The third-party ownership data may be retrieved by regression analysis server 135 from one or more financial institutions (e.g., financial institution servers 110) and/or dealerships (e.g., DM servers 120) within the geographic location of the operator. In other embodiments, the third-party ownership data may be retrieved from sources outside the geographic location of the operator and within a predetermined vicinity of the geographic location. In further embodiments, the third-party ownership data may be retrieved from any source, including, for example, national and/or international data sources.

At step 220, system 100 may be configured to determine a decommission rate for the target vehicle that is customized based on one or more vehicle census metrics. For example, regression analysis server 135 may compute the decommission rate based on the third-party ownership data (step 218). Regression analysis server 135 may be configured to analyze the third-party ownership data to determine an expected lifetime of the target vehicle by computing a sustained percentage of ownership of similar vehicles during a predetermined period. Stated differently, regression analysis server 135 may be configured to determine the decommission rate by extrapolating the vehicle census metrics over a lifetime of the target vehicle.

As merely an illustrative example, regression analysis server 135 may increase the decommission rate based on the third-party ownership data indicating the target vehicle having a relatively short lifetime, and may decrease the decommission rate based on the third-party ownership data indicating the target vehicle having a relatively long lifetime. As described in greater detail herein, the decommission rate may be incorporated into a predictive regression model for generating an output in response to the valuation request received at step 202.

At step 222, system 100 may be configured to retrieve local environmental data from one or more sources, such as, for example, traffic data server 125 and/or weather data server 140. The local environmental data may be received at regression analysis server 135 and may include historical records relating to weather conditions of the geographic location including average weather metrics of a temperature, an atmospheric pressure, a humidity, a wind speed/current, a precipitation rate and/or amount, and various other climate parameters.

In some embodiments, the local environmental data may further include land conditions of the geographic location including terrain metrics of a topography, a slope, a road elevation, a road length, a type/quality of roadway (e.g., local, collector, arterial, interstate highways, etc.), a material composition or roughness of travel (road) surfaces (e.g., hot mix asphalt, tar and chip, earth, gravel, concrete, etc.), and various other ground parameters. In some embodiments, the local environmental data may further include traffic metrics of the geographic location including average measurements of a traffic density (e.g., vehicle volume), an accident count/frequency (e.g., of vehicles similar to the target vehicle, of all vehicles, etc.), traffic trend/flow patterns, miles traveled, and more. The local environmental data may be detected and recorded by one or more sources, such as, for example, traffic cameras, online mapping services, and more.

The local environmental data may be indicative of a wear and tear expectancy of the target vehicle from use in the geographic location. The local environmental data may be retrieved by regression analysis server 135 from one or more traffic data server(s) 125 and/or weather data server(s) 140 including data for the geographic location of the operator. In embodiments where the driver data (step 204) indicates routine use of the target vehicle outside the geographic location, the local environmental data may be retrieved from traffic data server(s) 125 and/or weather data server(s) 140 storing data for areas coinciding with those areas commonly traveled by the target vehicle.

At step 224, system 100 may be configured to determine a travel condition variable that is customized based on one or more terrain metrics. For example, regression analysis server 135 may compute the travel condition variable for the target vehicle based on the local environmental data for the one or more locations in which the target vehicle is commonly operated. The travel condition variable may be based on a type, quality, and condition of surfaces on which the target vehicle routinely travels on (e.g., daily, weekly, monthly, annually, etc.). Further, the travel condition variable may be based on average changes in elevation experienced by the target vehicle (e.g., daily, weekly, monthly, annually, etc.) between routine destinations. Regression analysis server 135 may assign a score, a weighted factor, and/or a multiplier to the travel condition variable based on determining an association between the local environmental data and historic resale values of similar vehicles, as retrieved from one or more of financial institution server(s) 110, DM server(s) 120, traffic data server(s) 125, and/or weather data server(s) 140. As described in greater detail herein, the travel condition variable may be incorporated into a deterioration rate for generating a predictive regression model.

At step 226, system 100 may be further configured to determine a climate exposure variable of the target vehicle that is customized based on one or more weather metrics. For example, regression analysis server 135 may compute the climate exposure variable for the target vehicle based on the local environmental data at the one or more locations in which the target vehicle is commonly operated, as defined by the vehicle data and/or the driver data (step 204). The climate exposure variable may be based on average natural weather conditions that the target vehicle may be exposed to during operation at the one or more locations. In some embodiments, regression analysis server 135 may compute the climate exposure variable to exclude portions of travel at and/or between the one or more locations in which the target vehicle may not be exposed to natural weather conditions (e.g., tunnels, covered roadways, etc.). Further, the climate exposure variable may factor in conditions at one or more locations where the target vehicle may not be in operation based on whether the vehicle data (step 204) indicates the target vehicle being parked outdoors or indoors when not in use.

The climate exposure variable may determine a wear and tear on an exterior and/or interior of the target vehicle. For example, weather exposure may impact a corrosive resistance of the target vehicle's exterior, a frictional grip of the target vehicle's tires, an electrical storage of the target vehicle's battery, a mobility of the target vehicle's suppression and/or shock absorbers, and more. Regression analysis server 135 may assign a score, a weighted factor, and/or a multiplier to the climate exposure variable based on determining an association between the local environmental data and historic resale values of similar vehicles, as retrieved from one or more of financial institution server(s) 110, DM server(s) 120, traffic data server(s) 125, and/or weather data server(s) 140. As described in greater detail herein, the climate exposure variable may be incorporated into a deterioration rate for generating a predictive regression model.

At step 228, system 100 may be configured to determine a travel exposure variable that is customized based on one or more traffic metrics. For example, regression analysis server 135 may compute the travel exposure variable for the target vehicle based on the vehicle data indicating the one or more locations to which the target vehicle travels. The travel condition variable may be based on a frequency of use, a use pattern (e.g., carrying heavy loads, off-roading, etc.), and/or average commuting distance(s) experienced by the target vehicle (e.g., daily, weekly, monthly, yearly, etc.) between routine destinations. The travel condition variable may be further based on an average distance traveled per speed category based on an assigned speed limit between the one or more locations to which the target vehicle travels. Regression analysis server 135 may assign a score, a weighted factor, and/or a multiplier to the travel exposure variable based on determining an association between the vehicle data and historic resale values of similar vehicles, as retrieved from one or more of financial institution server(s) 110 and/or DM server(s) 120. As described in greater detail herein, the travel exposure variable may be incorporated into a deterioration rate for generating a predictive regression model.

At step 230, system 100 may be configured to determine a driver exposure variable that is customized based on one or more driver variables. For example, regression analysis server 135 may compute the driver exposure variable based on the driver data. The driver exposure variable may be based on the driving behavior classification (e.g., excellent, good, fair, poor, etc.), driving record, accident history, driving experience, driving style (e.g., break patterns, speeding tendencies, etc.), and more. Regression analysis server 135 may assign a score, a weighted factor, and/or a multiplier to the driver exposure variable based on determining an association between the driver data and historic resale values of similar vehicles. As described in greater detail herein, the driver exposure variable may be incorporated into a deterioration rate for generating a predictive regression model.

At step 232, system 100 may be configured to determine a deterioration rate for the target vehicle that is customized based on one or more parameters. For example, regression analysis server 135 may compute the deterioration rate based on the wear and tear expected on the target vehicle based on the travel condition variable (step 224), the climate exposure variable (step 226), the travel exposure variable (step 228), and/or the driver exposure variable (step 230). The deterioration rate may be further determined based on the vehicle characteristics defined by the vehicle data (steps 202, 204), such as, for example, components and/or features included on the target vehicle for minimizing a degree of wear and tear, and more.

As merely an illustrative example, regression analysis server 135 may increase the deterioration rate pursuant to the driving behavior classification of the operator(s) being relatively fair and/or poor, and decrease the deterioration rate when the driving behavior classification is relatively excellent and/or good. By way of further example, regression analysis server 135 may increase the deterioration rate when the driving history includes information indicative of the operator(s) having an accident history, and decrease the deterioration rate when the driving history is indicative of the operator(s) having a clean (e.g., accident free) driving record. Further, regression analysis server 135 may increase the deterioration rate when the operator(s) has relatively minimal driving experience (e.g., 0-5 years), and decrease the deterioration rate when the operator(s) has relatively greater driving experience (e.g., 6+ years). Regression analysis server 135 may further adjust the deterioration rate based on the geographic location or market.

It should be understood that regression analysis server 135 may determine the deterioration rate based on a plurality of dynamic factors (e.g., the travel exposure variable, the driver exposure variable, etc.) and a plurality of static factors (e.g., the travel condition variable, the climate exposure variable, etc.). Accordingly, the deterioration rate computed by regression analysis server 135 may vary depending at least partially on the data available (e.g., local environmental data, etc.) when determining the deterioration rate. As described in greater detail herein, the deterioration rate may be incorporated into a predictive regression model for generating an output in response to the valuation request received at step 202.

At step 234, system 100 may be configured to generate a predictive regression model for the target vehicle. Regression analysis server 135 may build the predictive regression model by incorporating one or more of the data, variables, and/or rates described in detail above into a prescribed association with one another. In some embodiments, the predictive regression model may be developed from a predefined formula defining average expected vehicle sale prices relative to an elapsed duration specific to a geographic location of the operator(s). Thus, the predefined formula is personalized based on the average expected vehicle sale prices for the market in which the target vehicle is routinely operated. The predefined formula may include a base logarithmic model such that regression analysis server 135 may be configured to integrate values into the base logarithmic model for each of the one or more determined variables. Regression analysis server 135 may be further configured to modify each of the values of the base logarithmic model with one or more of a score, a weighted factor, and/or a multiplier of the determined rates.

In some examples, the predefined formula may be rooted on a base correlation between sales price and time of a plurality of all vehicles (e.g., received from financial institution server 110, DM server 120, etc.) such that the predefined formula may define a comprehensive relationship for various vehicles having a different a make, model, trim, year, etc. In other examples, the predefined formula may be built on a correlation between sales price and time accumulated from a plurality of similar vehicles such that the predefined formula may define a universal relationship for vehicles having a similar characteristics, such as a class (e.g., passenger vehicle mini, passenger vehicle light, passenger vehicle compact, passenger vehicle medium, passenger vehicle heavy, sport utility vehicle, van, pickup truck, etc.), make, model, trim, year, etc.

Stated differently, regression analysis server 135 may be configured to customize the predefined formula by adding, removing, replacing, and/or modifying values of the predefined formula with variables specific to the target vehicle, including, for example, the vehicle data (steps 202, 204), the driver data (step 204), the third-party transaction data (step 206), the third-party performance data (step 208), the vehicle safety variable (step 210), the third-party trend data (step 212), the vehicle marketability variable (step 214), the deterioration rate (step 216), the third-party ownership data (step 218), the decommission rate (step 220), the local environmental data (step 222), the travel condition variable (step 224), the climate exposure variable (step 226), the travel exposure variable (step 228), the driver exposure variable (step 230), and/or the deterioration rate (step 232).

In some embodiments, regression analysis server 135 may be configured to cluster two or more predefined formulas together into one or more categories having at least one similar characteristic to extrapolate the correlation of sales price and time for newer vehicles having limited available data (e.g., sales history). It should be understood that with limited data available for newer vehicles, regression analysis server 135 may identify a related data curve of a similar vehicle to be applicable for extrapolating a valuation estimate of the new vehicle. Regression analysis server 135 may be capable of predicting the impact of various parameters of the newer vehicle (e.g., performance, safety, trend, marketability, deterioration, depreciation, decommission, etc.) on a valuation by analyzing a partial data curve of the particular parameter for comparison to the data curve of other similar vehicles. Upon identifying a vehicle having a data curve (for the subject parameter) that is substantially similar to the partial data curve of the newer vehicle (at least relative to the data curves of other vehicles), regression analysis server 135 may be configured to extrapolate values from said data curve when determining a valuation of the newer vehicle.

At step 236, system 100 may be configured to generate an output to the valuation request received at step 202. In some embodiments, regression analysis server 135 may execute the predictive regression model to build a valuation curve of the target vehicle and determine the output to the valuation request. For example, regression analysis server 135 may determine a current day economic valuation of the target vehicle, an optimum, economic time for the operator (e.g., an owner of the target vehicle) to sell the target vehicle, and/or an optimum, economic time for the operator (e.g., a prospective buyer of the target vehicle) to purchase the target vehicle.

In further embodiments, regression analysis server 135 may determine an optimum vehicle for the operator (e.g., a prospective buyer) to purchase. For example, regression analysis server 135 may be configured to determine one or more vehicle features (e.g., add-ons), colors, trims, devices, systems, technologies, etc. that may include the greatest contribution to a respective resale valuation of a vehicle. It should be appreciated that system 100 may be configured to generate various other suitable outputs than those shown and described herein without departing from a scope of this disclosure. Regression analysis server 135 may transmit the output to request processing server 130 for communication to user device 105.

Upon communicating the output to the operator at user device 105, system 100 may be configured to periodically determine whether additional data is available from one or more of financial institution server 110, DM server 120, traffic data server 125, and/or weather data server 140 for dynamically modifying the predictive regression model. At step 238, system 100 may allow a predetermined duration (e.g., one or more seconds, minutes, hours, days, weeks, months, years, etc.) to lapse prior to inquiring with the one or more databases at step 240. The predetermined duration may be preprogrammed by regression analysis server 135 and/or manually set by an operator of system 100 (e.g., via user device 105).

In some embodiments, the predetermined duration may be determined by regression analysis server 135 as a function of one or more characteristics of the target vehicle, the operator, and/or the geographic location. For example, regression analysis server 135 may be configured to increase the predetermined duration when the target vehicle includes one or more characteristics (e.g., vehicle data) indicative of an established sale history, performance history, marketability, ownership, etc. Examples of vehicles having an increased predetermined duration may include, but are not limited to, vehicles of a relatively older model, greater mileage, etc. Regression analysis server 135 may be configured to decrease the predetermined duration when the target vehicle includes one or more characteristics indicative of a developing sale history, performance history, marketability, ownership, etc. Examples of vehicles having a decreased predetermined duration may include, but are not limited to, vehicles of a relatively newer model, smaller mileage, etc. It should be appreciated that vehicles having an established track record may be less likely to experience significant fluctuations in data relative to newer vehicles such that the predetermined duration for assessing the availability of updated data may be greater for such vehicles. In other embodiments, the predetermined duration may be substantially similar for all vehicles.

In response to determining the databases do not include updated data (e.g., third-party transaction data, third-party performance data, third-party trend data, third-party ownership data, local environmental data, etc.) at step 240, system 100 may be configured to return to step 238 to allow the predetermined duration to lapse prior to reassessing the availability of updated data from the one or more databases. In response to determining the databases do include updated data, system 100 may be configured to modify the predictive regression model at step 242 with the updated data. Additionally and/or alternatively, the operator of system 100 may input the updated data (e.g., vehicle data, driver data, etc.) via user device 105.

Regression analysis server 135 may modify the predictive regression model by incorporating the updated data (e.g., vehicle data, driver data, third-party transaction data, third-party performance data, third-party trend data, third-party ownership data, local environmental data, etc.) into the logarithmic model to build a subsequent iteration of the base formula. Stated differently, regression analysis server 135 may be configured to dynamically modify one or more of the vehicle safety variable, the vehicle marketability variable, the travel condition variable, the climate exposure variable, the travel exposure variable, the driver exposure variable, the depreciation rate, the decommission rate, and/or the deterioration rate as initially computed in the base logarithmic model at step 234. Upon modifying the predictive regression model at step 242, regression analysis server 135 may be configured to return to step 236 to generate an updated output to the initial valuation request for communication to the operator via user device 105.

In some embodiments, regression analysis server 135 may be configured to store one or more of the data, the computed variables and rates, and the generated models (collectively referred to as "test data") from steps 202 to 242 above for machine-learning techniques. For example, regression analysis server 135 may compile the test data for each target vehicle of which system 100 may be utilized by a user to execute process 200. The test data may be aggregated and analyzed by regression analysis server 135 to conduct one or more machine-learning techniques to build modified models for one or more of the variables (e.g., vehicle safety variable, vehicle marketability variable, travel condition variable, climate exposure variable, travel exposure variable, driver exposure variable, etc.), the rates (e.g., depreciation rate, decommission rate, deterioration rate, etc.), and/or the pre-defined formulas for the predictive regression models. Stated differently, regression analysis server 135 may be configured to increase an accuracy of the calculations implemented to determine the variables, rates, and formulas for generating the predictive regression model by collecting the test data from previously-executed valuation requests of process 200 to build a modified computation model (e.g., formula) for each of the variables, rates, and/or predefined formulas.

It should be appreciated that the steps of process 200 shown and described herein may be performed by one element of system 100. For example, request processing server 130 may be configured to initiate and direct performance of process 200. In the example, request processing server 130 may implement process 200 by retrieving data from one or more servers of system 100 and communicating said data to regression analysis server 135 for determination of one or more variables and/or rates. Request processing server 130 may further implement process 200 by retrieving said variables and/or rates from regression analysis server 135 and generating one or more models and/or outputs. In this instance, implementation of process 200 may originate from and be executed through request processing server 130. In other embodiments, regression analysis server 135 may be configured to initiate and administer execution of process 200.

Figure 3:
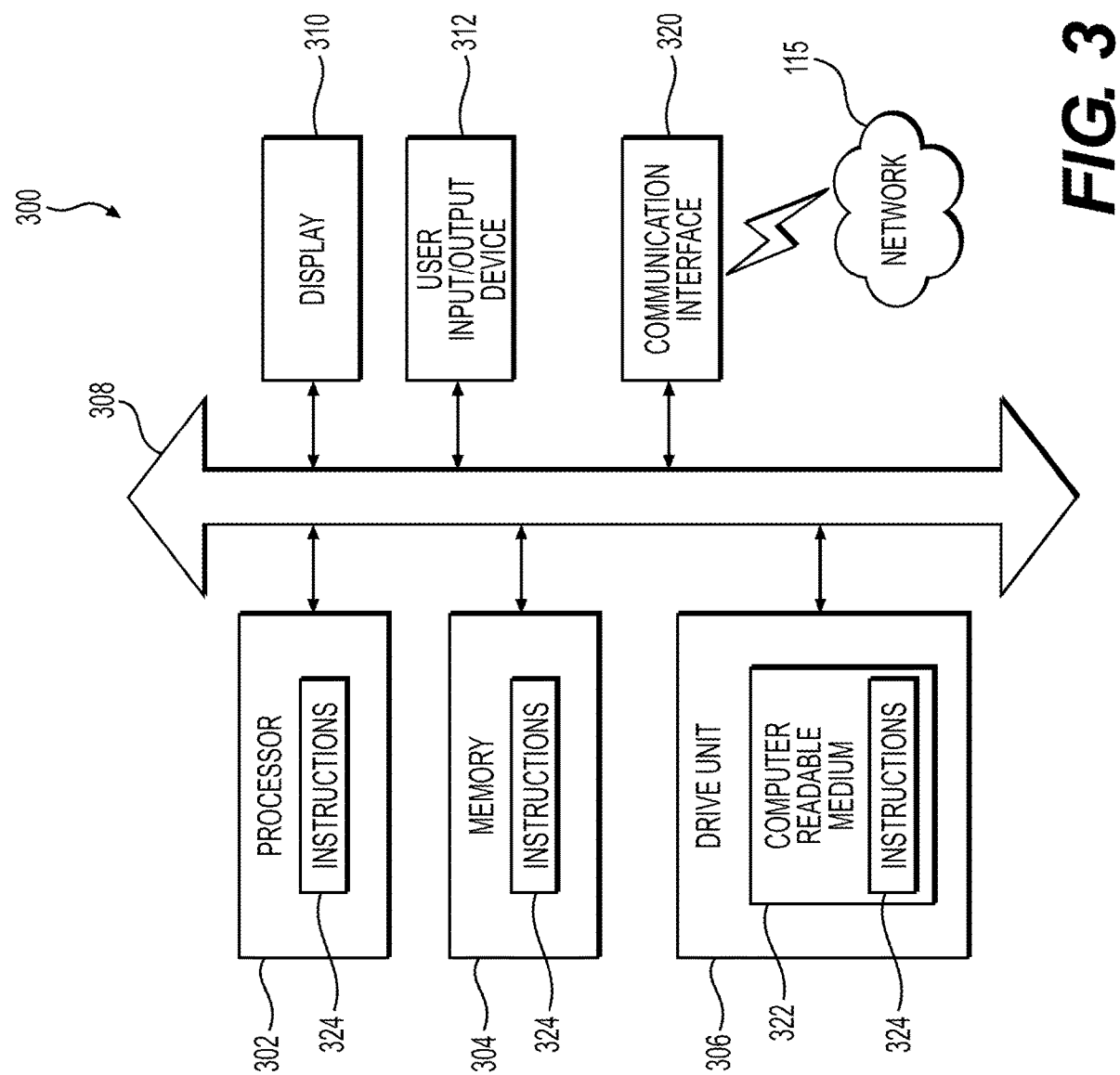
FIG. 3 depicts an example of a computing device, according to aspects of the present disclosure.

FIG. 3 is a simplified functional block diagram of a computing device 300 that may be configured as a device for executing the methods of FIG. 2, according to exemplary embodiments of the present disclosure. Any of the devices, databases (e.g., servers), processors, etc. of system 100 discussed herein may be an assembly of the hardware of computing device 300 including, for example, user device 105, financial institution server 110, request processing server 130, and/or regression analysis server 135 according to exemplary embodiments of the present disclosure.

Computing device 300 may include a central processing unit ("CPU") 302 that may be in the form of one or more processors configured to execute program instructions, such as those of process 200 described in detail above. In some embodiments, the processor(s) of CPU 302 includes both a CPU and a GPU. Computing device 300 may further include a storage unit 306 that may include non-volatile memory, such as, for example, a storage media (e.g., solid-state drives), ROM, HDD, SDD, etc. Examples of storage media include solid-state storage media (e.g., solid state drives and/or removable flash memory), optical storage media (e.g., optical discs), and/or magnetic storage media (e.g., hard disk drives). Storage unit 306 may store data on a computer readable medium 322. In some embodiments, computing device 300 may receive programming and data via network communications from electronic network 115, such as, for example, via a communication interface 320 configured to communicate with one or more other components of system 100.

Still referring to FIG. 3, computing device 300 may include a memory 304 that is volatile memory, such as, for example, RAM, solid-state memories, optical storage media (e.g., optical discs), magnetic storage media (e.g., hard disk drives), etc. Memory 304 may be configured for storing one or more instructions 324 for executing techniques presented herein, such as those of process 200 shown and described above. Memory 304 may further include a non-transitory computer-readable medium. Therefore, whenever a computer-implemented method is described in this disclosure, this disclosure shall also be understood as describing a non-transitory computer-readable medium storing instructions that, when executed by one or more processors (e.g., CPU 302), cause the one or more processors to perform the computer-implemented method.

In some embodiments, the one or more instructions 324 may be stored temporarily or permanently within other modules of computing device 300, such as, for example, CPU 302, computer readable medium 322, and more. Computing device 300 may include an input/output device 312 including one or more input ports and one or more output ports. Input/output device 312 may include, for example, a keyboard, a mouse, a touchscreen, etc. (i.e., input ports). Input/output device 312 may further include a monitor, a display, a printer, etc. (i.e. output ports). Computing device 300 may further include a display device 310 configured to connect with input/output device 312. The aforementioned elements of computing device 300 may be connected to one another through an internal communication bus 308, which represents one or more busses.

In other embodiments, the various system functions of process 200 shown in FIG. 2 may be implemented in a distributed fashion on a number of similar platforms to distribute the processing load on multiple computing devices 300. Alternatively, the system functions may be implemented by appropriate programming of one computer hardware platform, such as, for example, computing device 300.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming.

All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer. Also, the presently disclosed embodiments may be applicable to any type of Internet protocol. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to, the process shown in FIG. 2, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
   receiving a request for a value of a target vehicle over a lifetime of the target vehicle, wherein the request includes input data associated with at least a user associated with the request, including driver data of the user and a geographic location of the user, and the target vehicle;
   determining a depreciation rate based on third-party transaction data retrieved from one or more databases in accordance with the input data associated with the target vehicle;
   determining a decommission rate based on third-party ownership data retrieved from the one or more databases in accordance with the input data associated with the target vehicle;
   determining a deterioration rate based on local environmental data retrieved from the one or more databases in accordance with the input data associated with the geographic location of the user;
   determining, using a regression model, the value of the target vehicle over the lifetime of the target vehicle based on a plurality of variables including the input data, the depreciation rate, the decommission rate, and the deterioration rate, wherein the value is specific to the user associated with the request based on the use of the input data associated with the user in the determination, and wherein the regression model is built on test data from previously executed requests for values of target vehicles and includes a base logarithmic model having a plurality of weighted factors associated with the plurality of variables;
   providing the value in response to the request; determining a duration between periodic queries of the one or more databases to determine whether additional data, including additional third-party transaction data, additional third-party ownership data, or additional local environmental data, is stored in the one or more databases, wherein the duration is determined as a function of one or more characteristics of one or more of the target vehicle, the user, and the geographic location that are indicative of data stability;

periodically querying the one or more databases in accordance with the duration;

in response to determining additional data is stored in the one or more databases based on the periodic querying, retrieving the additional data from the one or more databases, updating one or more of the depreciation rate, the decommission rate, and the deterioration rate based on the additional data, and modifying the regression model based on the updated one or more of the depreciation rate, the decommission rate, and the deterioration rate, wherein modifying the regression model further includes building a subsequent iteration of the base logarithmic model; and providing an updated value of the target vehicle determined by the modified regression model as an updated response to the request.

2. The computer-implemented method of claim 1, wherein the local environmental data comprises terrain metrics including a slope, a quality, a length, or a material composition of one or more road surfaces in the geographic location.

3. The computer-implemented method of claim 2, further comprising determining a travel condition variable of the one or more road surfaces in the geographic location based on the terrain metrics; and wherein the deterioration rate includes the travel condition variable.

4. The computer-implemented method of claim 1, wherein the local environmental data comprises weather metrics including average annual measurements of a temperature, a precipitation, a humidity, a wind speed, and/or a pressure in the geographic location, and the method further comprises:

determining a climate exposure variable of the geographic location based on the weather metrics, wherein the deterioration rate includes the climate exposure variable.

5. The computer-implemented method of claim 1, wherein the local environmental data comprises traffic metrics including average annual measurements of a vehicle volume, an accident count, a quantity of miles traveled, and/or a traffic trend in the geographic location, and the method further comprises:

determining a travel exposure variable of the geographic location based on the traffic metrics, wherein the deterioration rate includes the travel exposure variable.

6. The computer-implemented method of claim 1, wherein the third-party transaction data comprises transactional metrics including average annual measurements of a new sales price, a used sales price, a trade-in sales price, and/or an appraisal price of the target vehicle; and further comprising determining the depreciation rate by extrapolating the transactional metrics over the lifetime of the target vehicle.

7. The computer-implemented method of claim 1, wherein the third-party ownership data comprises vehicle census metrics including average annual measurements of a purchase, a sale, an accident, and/or a loss of vehicles related to the target vehicle; and further comprising determining the decommission rate by extrapolating the vehicle census metrics over the lifetime of the target vehicle.

8. The computer-implemented method of claim 1, wherein the input data associated with the target vehicle includes a make, a model, a trim, an age, a mileage, an add-on feature, and/or a present condition.

9. The computer-implemented method of claim 1, wherein the driver data of the user associated with the request comprises driver variables including a driver record, an accident history, a driving style, an average daily travel distance, and/or a use of the target vehicle; and further comprising determining a driving exposure variable of the user based on the driver variables, wherein the deterioration rate includes the driving exposure variable.

10. The computer-implemented method of claim 1, further comprising determining a safety variable based on third-party performance data retrieved from the one or more databases in accordance with the input data associated with the target vehicle; and wherein the depreciation rate includes the safety variable.

11. The computer-implemented method of claim 1, further comprising determining a marketability variable based on third-party trend data retrieved from the one or more databases in accordance with the input data associated with the target vehicle; and wherein the depreciation rate includes the marketability variable.

12. The computer-implemented method of claim 1, wherein the regression model is further configured to determine an optimum date to sell the target vehicle if the user is a current owner of the target vehicle or to purchase the target vehicle if the user is a prospective buyer of the target vehicle.

13. A computer-implemented method, comprising:

receiving input from a user as part of a valuation request, the input including driver data of the user, geographic location data of the user, and target vehicle data of a target vehicle;

retrieving third-party transaction data from one or more databases based on the target vehicle data to determine a depreciation rate for the target vehicle;

retrieving third-party ownership data from the one or more databases based on the target vehicle data to determine a decommission rate for the target vehicle;

retrieving local environmental data from the one or more databases based on the geographic location data of the user to determine a deterioration rate for the target vehicle specific to the user's geographic location;

determining, using a regression model, a value curve for the target vehicle based on a plurality of variables including the driver data, the target vehicle data, the depreciation rate, the decommission rate, and the deterioration rate, wherein the value curve is specific to the user based on the use of the driver data and the deterioration rate in the determination, and wherein the regression model is built on test data from previously executed valuation requests and includes a base logarithmic model having a plurality of weighted factors associated with the plurality of variables;

based on the value curve, determining and providing to the user, as a response to the valuation request, one or more of a current estimated value of the target vehicle, an optimum date to sell the target vehicle if the user is a current owner, an optimum date to purchase the target vehicle if the user is a prospective buyer, or an optimum type of target vehicle to purchase if the user is the prospective buyer;

determining a duration between periodic queries of the one or more databases to determine whether additional data, including additional third-party transaction data, additional third-party ownership data, or additional local environmental data, is stored in the one or more databases, wherein the duration is determined as a function of one or more characteristics of one or more of the target vehicle, the user, and the geographic location that are indicative of data stability;

periodically querying the one or more databases in accordance with the duration; in response to determining additional data is stored in the one or more databases based on the periodic querying, retrieving the additional data from the one or more databases, updating one or more of the depreciation rate, the decommission rate, and the deterioration rate based on the additional data, and modifying the regression model to determine a new value curve for the target vehicle based on the updated one or more of the depreciation rate, the decommission rate, and the deterioration rate, wherein modifying the regression model further includes building a subsequent iteration of the base logarithmic model; and based on the new value curve, determining and providing to the user, as an updated response to the valuation request, one or more of an updated current estimated value of the target vehicle, an updated optimum date to sell the target vehicle if the user is the current owner, an updated optimum date to purchase the target vehicle if the user is the prospective buyer, or an updated optimum type of target vehicle to purchase if the user is the prospective buyer.

14. The computer-implemented method of claim 13, further comprising:
determining a marketability variable based on third-party trend data retrieved from the one or more databases in accordance with the input associated with the target vehicle data, wherein the depreciation rate includes the marketability variable.

15. A system, comprising:
a processor; and a memory storing instructions that, when executed by the processor, causes the processor to perform operations including:
receiving a request from a user for a value estimate of a target vehicle, the request including driver data of the user, location data of the user, and vehicle data of the target vehicle;
retrieving third-party transaction data related to the vehicle data from one or more databases;
determining a depreciation rate for the target vehicle based on the third-party transaction data;
retrieving third-party ownership data related to the vehicle data from the one or more databases;
determining a decommission rate for the target vehicle based on third-party ownership data;
retrieving local environmental data related to the location data of the user from the one or more databases;
determining a deterioration rate for the target vehicle specific to the user's location and driving behavior based on the local environmental data and the driver data of the user;
determining, using a regression model, the value estimate of the target vehicle based on a plurality of variables including at least the deterioration rate and one or more of the third-party transaction data, the third-party ownership data, the local environmental data, the depreciation rate, or the decommission rate, wherein the value estimate determined is specific to the user based on the use of the deterioration rate in the determination, and wherein the regression model is built on test data from previously executed requests for value estimates of target vehicles and includes a base logarithmic model having a plurality of weighted factors associated with the plurality of variables;

responsive to the request, providing the value estimate to the user;

determining a duration between periodic queries of the one or more databases to determine whether additional data, including additional third-party transaction data, additional third-party ownership data, or additional local environmental data, is stored in the one or more databases, wherein the duration is determined as a function of one or more characteristics of one or more of the target vehicle, the user, and the location data that are indicative of data stability;

periodically querying the one or more databases in accordance with the duration; in response to determining additional data is stored in the one or more databases based on the periodic querying, retrieving the additional data from the one or more databases, updating one or more of the depreciation rate, the decommission rate, and the deterioration rate based on the additional data, and modifying the regression model based on the updated one or more of the depreciation rate, the decommission rate, and the deterioration rate to determine an updated value estimate of the target vehicle, wherein modifying the regression model further includes building a subsequent iteration of the base logarithmic model; and providing the value estimate of the target vehicle determined by the modified regression model as an updated response to the request.

16. The computer-implemented method of claim 1, wherein the user is a first user, the request is a first request, the value specific to the user is a first value, and the method further comprises:
receiving a second request for the value of the target vehicle over the lifetime of the target vehicle, wherein the second request includes input data associated with at least a second user associated with the second request, including driver data associated with the second user and a geographic location of the second user, and the target vehicle; and
determining, by the regression model, a second value of the target vehicle over the lifetime of the target vehicle using the input data, the depreciation rate, the decommission rate, and the deterioration rate, wherein the second value is different from the first value and is specific to the second user associated with the second request based on the use of the input data associated with the second user in the determination.

17. The computer-implemented method of claim 1, wherein:
the base logarithmic model includes a predefined formula for the target vehicle that is adjusted based on the input data, the depreciation rate, the decommission rate, and the deterioration rate,
the predefined formula is based on an average expected vehicle sale price relative to an elapsed duration over the lifetime of the target vehicle specific to the geographic location of the user that is determined based on historical sales data of the target vehicle, and
when the target vehicle is a new target vehicle, the base logarithmic model includes two or more predefined formulas for two or more other vehicles having one or more shared characteristics with the target vehicle.

18. The computer-implemented method of claim 1, wherein when at least one of the one or more characteristics indicative of stability that the duration is determined as a function of includes an age of a model of the target vehicle:
the duration is a first duration when the age of the model of the target vehicle is below a threshold number of years, and
the duration is a second duration that is longer than the first duration when the age of the model of the target vehicle is above the threshold number of years.

19. The computer-implemented method of claim 1, wherein when at least one of the one or more characteristics indicative of stability that the duration is determined as a function of includes a mileage of the target vehicle:
the duration is a first duration when the mileage of the target vehicle is below a threshold number of miles, and
the duration is a second duration that is longer than the first duration when the mileage of the target vehicle is above the threshold number of miles.

20. The computer-implemented method of claim 13, wherein when the one or more characteristics indicative of stability that the duration is determined as a function of includes one or more of an age of a model of the target vehicle or a mileage of the target vehicle:
the duration is a first duration when one or more of the age of the model of the target vehicle is below a threshold number of years or the mileage of the target vehicle is below a threshold number of miles, and
the duration is a second duration that is longer than the first duration when one or more of the age of the model of the target vehicle is above the threshold number of years or the mileage of the target vehicle is above the threshold number of miles.

* * * * *